March 6, 1928.                                                    1,661,424
H. E. HEINE
CHECK VALVE AND SCREEN
Filed July 11, 1925
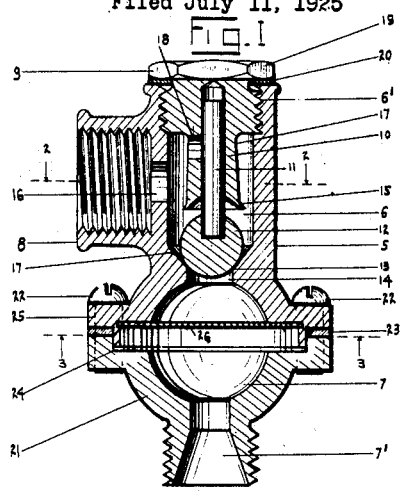
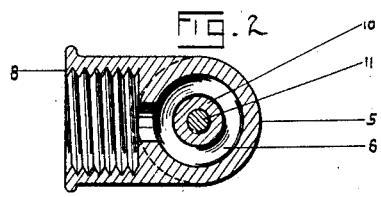
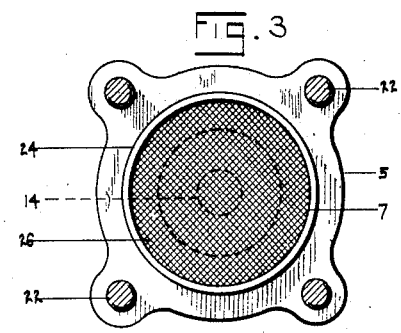
INVENTOR.
Herman E. Heine,
BY
Morsell, Keeney & Morsell,
ATTORNEYS.

Patented Mar. 6, 1928.

1,661,424

UNITED STATES PATENT OFFICE.

HERMAN E. HEINE, OF MILWAUKEE, WISCONSIN, ASSIGNOR TO BRADLEY WASH-FOUNTAIN COMPANY, OF MILWAUKEE, WISCONSIN, A CORPORATION OF WISCONSIN.

CHECK VALVE AND SCREEN.

Application filed July 11, 1925. Serial No. 43,007.

This invention relates to improvements in check valves and screens.

Check valves of ordinary construction are usually of conical or flat formation and have conical or flat seats. Dirt and other foreign matter passing through the valve has a tendency to accumulate on the valve and its seat with the result that the valve cannot perform its function until it is cleaned. Furthermore, the angular portions of the ordinary valve will retard the flow of the fluid through the valve or lessen the efficiency thereof.

It is one of the objects of the present invention to overcome the before mentioned objectionable features and provide a check valve and screen which is more efficient, and to the parts of which dirt and other foreign matter will not lodge.

A further object of the invention is to provide a check valve and screen having a screened portion for preventing dirt or other foreign matter from passing through the pipes to which the valve is connected and also to permit the easy removal of any dirt lodged on the screen.

A further object of the invention is to provide a check valve having a valve guide portion which may be easily removed with the valve when desired.

A further object of the invention is to provide a check valve and screen which is of simple construction, is strong and durable and is efficient in use.

With the above and other objects in view, the invention consists of the improved check valve and screen and its parts and combinations as set forth in the claims, and all equivalents thereof.

In the accompanying drawing, in which the same reference characters indicate the same parts in all of the views:

Fig. 1 is a vertical sectional view of the improved check valve and screen; and

Fig. 2 is a transverse sectional view thereof taken on line 2—2 of Fig. 1.

Fig. 3 is a transverse sectional view thereof taken on line 3—3 of Fig. 1.

Referring to the drawing, the numeral 5 indicates a valve casing having an upper valve chamber 6 and a lower screen chamber 7 of larger diameter than the valve chamber. The casing is also provided with an upper threaded opening 6′, a lower threaded opening 7′ and a threaded side portion opening 8. The upper and side portions 6 and 8 respectively, are formed with interior threads, while the lower portion opening 7′ is formed with an exterior thread. The upper portion 6 of the casing is closed by a threaded plug 9 which is provided with a downwardly extending tubular guide portion 10 for reciprocally receiving the upwardly extending stem 11 of the valve 12. Said valve is of spherical or ball shape and is adapted to normally rest upon the valve seat 13 to close the opening or port 14. The lower end portion of the guide is provided with a part spherical recess 15 to receive the valve when in its open position. It will be noted that the diameter of the guide is substantially the same as the valve so that when the valve is in its upper position it will form a continuation of the guide with a rounded end, thus eliminating shoulders so that the fluid will flow thereby without undue friction. The guide 10 tapers upwardly to decrease the diameter to provide more space around the guide for the flow of the fluid. The lower portion of the valve chamber 6 is also of tapered formation, as indicated by the numeral 17, to eliminate friction. The opening 16 through the side portion 8 is above the plane of the valve so that the flow of fluid will not be directly against one side of the valve which would exert a tendency to cause a chattering of the valve, whereas by directing it upwardly around the guide, the fluid will circulate around the guide and move the valve upwardly and into the recess 15 of said guide without side thrust. To prevent the valve, while in its upper position, from sticking to the guide, said guide is provided with a transverse opening 18 which permits fluid to enter the bore of the guide above the valve to balance the pressure which may be on the lower side portion of the valve.

The head 19 of the threaded plug 9 is of sufficient size to bear against a packing ring 20 interposed between the head and the upper end of the valve casing to form a fluid tight connection therebetween.

The screen portion of the casing is divided horizontally into two sections and the lower part 21 is connected to the upper part by screws 22. A washer or gasket 23 interposed between the two sections and extending around an annular flange 24 of the upper section forms a tight joint between the two sections. The flange 24 fits the lower section 21 and holds the two sections in alinement. The inner portion of the flange 24 a slight distance above its lower edge is formed with an annular recess or groove 25 for receiving and holding the peripheral edge of a wire screen 26 mounted therein. The screen may be easily snapped into the recess or easily removed therefrom.

From the foregoing description it will be seen that the check valve and screen is of very simple construction and is well adapted to eliminate the lodging of dirt or other foreign material around the valve or its seat, and that the valve is efficient in use.

What I claim as my invention is:

1. A check valve and screen, comprising a casing having a valve chamber and a recessed screen chamber and openings thereto, a valve seat between the two chambers, a guide member extending downwardly into the valve chamber below the outlet opening and having a bore in line with the valve seat, a screen extending across the screen chamber and within the recessed portion thereof, and a valve of spherical shape engaging the valve seat and having a vertically extending stem portion which reciprocally extends into the bore of the guide.

2. A check valve and screen, comprising a casing having a valve chamber and a screen chamber and openings thereto, a valve seat formed between the two chambers, a guide member threaded into the upper portion of the valve chamber and having a portion depending downwardly therefrom and provided with a bore which is in line with the valve seat, the portion of the casing forming the screen chamber being formed of two parts bolted together and one of said parts having an annular recess, a screen mounted in said recess, and a valve of spherical shape engaging the valve seat and having a vertically extending stem portion which reciprocally extends into the bore of the guide.

3. A check valve, comprising a casing having a valve chamber and upper and lower and side openings in communication therewith, a valve seat in communication with the lower opening, a guide member threaded into the upper opening and having a depending portion provided with a bore which is in line with the valve seat, said depending portion extending below the plane of the side opening, and a valve of spherical shape engaging the valve seat and having a vertically extending stem portion which reciprocally extends into the bore of the guide member, the depending portion of the guide member limiting the upward movement of the valve to a point below the plane of the upper side opening to prevent side thrust on the valve.

In testimony whereof, I affix my signature.

HERMAN E. HEINE.